US008575260B2

(12) United States Patent
Arancio et al.

(10) Patent No.: US 8,575,260 B2
(45) Date of Patent: Nov. 5, 2013

(54) POLYMER THICK FILM ENCAPSULANT AND ENHANCED STABILITY PTC CARBON SYSTEM

(75) Inventors: Vince Arancio, Bristol (GB); Jay Robert Dorfman, Durham, NC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 242 days.

(21) Appl. No.: 13/308,622

(22) Filed: Dec. 1, 2011

(65) Prior Publication Data

US 2012/0067867 A1   Mar. 22, 2012

Related U.S. Application Data

(62) Division of application No. 12/764,185, filed on Apr. 21, 2010, now Pat. No. 8,093,328.

(51) Int. Cl.
*C08L 27/00* (2006.01)
*B23K 13/08* (2006.01)

(52) U.S. Cl.
USPC .......................................... 524/520; 219/482

(58) Field of Classification Search
USPC ....................................................... 524/520
See application file for complete search history.

(56) References Cited

U.S. PATENT DOCUMENTS

| 5,714,096 A | 2/1998 | Dorfman |
| 2005/0062023 A1* | 3/2005 | Korzhenko et al. ........... 252/500 |

FOREIGN PATENT DOCUMENTS

EP    1505117 A1    2/2005

OTHER PUBLICATIONS

International Search Report for International Application No. PCT/US2011/033149 Dated Jul. 15, 2011.

* cited by examiner

*Primary Examiner* — Hui Chin

(57) ABSTRACT

The invention is directed to a polymer thick film encapsulant composition comprising thermoplastic fluoropolymer resin and acrylic resin dissolved in organic solvents. The deposited encapsulant composition is processed at a time and energy sufficient to remove all solvent and form an encapsulant. The invention is further directed to using the encapsulant composition to form an encapsulant in PTC heater circuitry and, in particular, in PTC heater circuitry in mirror heater and seat heater applications.

7 Claims, No Drawings

POLYMER THICK FILM ENCAPSULANT AND ENHANCED STABILITY PTC CARBON SYSTEM

FIELD OF THE INVENTION

This invention is directed to a polymer thick film encapsulant composition. Encapsulants made from the composition can be used in various electronic applications to protect electrical elements and particularly to encapsulate a Positive Temperature Coefficient carbon resistor for use in self-regulating heater circuits.

BACKGROUND OF THE INVENTION

Encapsulants have long been used to protect electrical elements. Positive Temperature Coefficient (PTC) circuits are typically used as self-thermostating circuits, for example, in automobile mirror heaters and seat heaters. They are used in place of an external thermostat. Although they have been used for years in these types of applications, the performance of the PTC circuits typically have performance problems as a result of resistance shift stability, powered on/off cycling inconsistency, and sensitivity to their environment. All these issues can have a negative impact on a functional PTC circuit. One of the purposes of this invention to alleviate these issues and produce a more efficient and reliable PTC circuit with enhanced stability

SUMMARY OF THE INVENTION

This invention relates to a polymer thick film encapsulant composition comprising:
 (a) a first organic medium comprising 30-60 wt % thermoplastic fluoropolymer resin dissolved in a first organic solvent, wherein the weight percent is based on the total weight of the first organic medium; and
 (b) a second organic medium comprising 10-50 wt % acrylic resin dissolved in a second organic solvent, wherein the weight percent is based on the total weight of the second organic medium.

In some embodiments the thermoplastic fluoropolymer resin is a polyvinylidene fluoride homopolymer or a polyvinylidene fluoride-based copolymer. In one such embodiment the thermoplastic fluoropolymer resin is polyvinylidene fluoride-hexafluoropropylene-tetrafluoroethylene copolymer. The acrylic resin of some embodiments is methyl methacrylate copolymer.

The invention is further directed to using the encapsulant to form an encapsulant in PTC heater electrical circuits and, in particular, in the PTC circuitry in mirror heater and seat heater applications. The invention provides heaters comprising such an encapsulant. The encapsulant has been found to improve the stability of the PTC circuit.

DETAILED DESCRIPTION OF INVENTION

The invention relates to a polymer thick film encapsulant composition for use in forming an encapsulant in electrical circuits and, in particular, in PTC heating circuits. A layer of encapsulant is printed and dried on an active PTC carbon resistor so as to encapsulate and protect the PTC resistor.

The polymer thick film (PTF) encapsulant composition is comprised of two organic media, each comprising a polymer resin and a solvent. Additionally, powders and printing aids may be added to improve the composition.

Organic Media

The first organic medium is comprised of a thermoplastic fluoropolymer resin dissolved in a first organic solvent. The fluoropolymer resin must achieve good adhesion to both the electrical element, e.g., the PTC carbon layer, and the underlying substrate. It must be compatible with and not adversely effect the performance of the electrical element. In one embodiment the thermoplastic fluoropolymer resin is 30-60 wt % of the total weight of the first medium. In another embodiment the thermoplastic fluoropolymer resin is 35-55 wt % of the total weight of the first medium and in still another embodiment the thermoplastic fluoropolymer resin is 47-53 wt % of the total weight of the first medium. In some embodiments the thermoplastic fluoropolymer resin is a polyvinylidene fluoride homopolymer or a polyvinylidene fluoride-based copolymer. One such polyvinylidene fluoride-based copolymer is polyvinylidene fluoride-hexafluoropropylene-tetrafluoroethylene copolymer.

The second organic medium is comprised of an acrylic resin dissolved in a second organic solvent. In one embodiment the acrylic resin is 10-50 wt % of the total weight of the second medium. In another embodiment the acrylic resin is 20-40 wt % of the total weight of the second medium and in still another embodiment the acrylic resin is 25-35 wt % of the total weight of the second medium. In one embodiment the acrylic resin is methyl methacrylate copolymer.

The polymer resin is typically added to the organic solvent by mechanical mixing to form the medium. Solvents suitable for use in the polymer thick film composition are recognized by one of skill in the art and include acetates and terpenes such as carbitol acetate and alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate may be included. In many embodiments of the present invention, solvents such as glycol ethers, ketones, esters and other solvents of like boiling points (in the range of 180° C. to 250° C.), and mixtures thereof may be used. Various combinations of these and other solvents are formulated to obtain the viscosity and volatility requirements desired. The solvents used must solubilize the resins. The first solvent and second solvent may be different or may be the same.

Typically, the first medium is from 70 to 97 wt % of the total weight of the PTF encapsulant composition and the second medium is from 3 to 30 wt % of the total weight of the PTF encapsulant composition. In one embodiment, the first medium is from 80 to 96 wt % of the total weight of the PTF encapsulant composition and the second medium is from 4 to 20 wt % of the total weight of the PTF encapsulant composition.

Powders

Various powders may be added to the PTF encapsulant composition to improve adhesion, modify the rheology and increase the low shear viscosity thereby improving the printability. One such powder is fumed silica.

Application of the PTF Encapsulant Composition

The PTF encapsulant composition, also referred to as a "paste", is typically deposited on a substrate, such as polyester, that is impermeable to gases and moisture. The substrate can also be a sheet of a composite material made up of a combination of plastic sheet with optional metallic or dielectric layers deposited thereupon.

The deposition of the PTF encapsulant composition is performed typically by screen printing, but other deposition techniques such as stencil printing, syringe dispensing or coating techniques can be utilized. In the case of screen-printing, the screen mesh size controls the thickness of the deposited thick film.

Generally, a thick film composition comprises a functional phase that imparts appropriate electrically functional properties to the composition. The functional phase comprises electrically functional powders dispersed in an organic medium that acts as a carrier for the functional phase. Generally, the composition is fired to burn out both the polymer and the solvent of the organic medium and to impart the electrically functional properties. However, in the case of a polymer thick film, the polymer portion of the organic medium remains as an integral part of the composition after drying. Prior to firing, a processing requirement may include an optional heat treatment such as drying, curing, reflow, and others known to those skilled in the art of thick film technology.

The PTF encapsulant composition is processed for a time and at a temperature necessary to remove all solvent. For example, the deposited thick film is dried by exposure to heat at 140° C. for typically 10-15 min.

PTC Heating Circuit

One uses of the PTF encapsulant composition is as an encapsulant for the PTC resistor in a PTC heating circuit. In one embodiment this PTC resistor is comprised of PTC carbon black. One such carbon black resistor is disclosed in Dorfman, U.S. Pat. No. 5,714,096. This PTC carbon black resistor is formed by screen printing a positive temperature coefficient composition comprising:

(i) 15-30 wt % carbon black possessing a DBP absorption of about 125 cc/100 g carbon black or less;
(ii) 10-40 wt % chlorinated, maleic anhydride grafted polypropylene resin; and
(iii) organic medium capable of solubilizing the resin, wherein the composition is heated to remove the organic medium and thereby forms a positive temperature coefficient carbon resistor.

The PTF encapsulant composition is then screen printed onto the PTC carbon resistor so that it encapsulates the positive temperature coefficient carbon resistor and is dried to form the encapsulant. As pointed out in Dorfman, U.S. Pat. No. 5,714,096 low structure carbon blacks are preferred. A common test used to quantify low structure is the absorption of dibutyl phthalate (DBP) oil, measured in cc's of oil absorbed per 100 grams of carbon black.

EXAMPLE 1

The PTF encapsulant composition was prepared in the follow manner. The first organic medium, Medium A, was prepared by mixing 50.0 wt % KYNAR® 9301 (obtained from Arkema Inc., Phila., Pa.) polyvinylidene fluoride-hexafluoropropylene-tetrafluoroethylene copolymer resin with 50.0 wt % carbitol acetate (obtained from Eastman Chemical, Kingsport, Tenn.) organic solvent. The molecular weight of the resin was approximately 20,000. This mixture was heated at 90° C. for 1-2 hours to dissolve all the resin. The second organic medium, Medium B, was produced by adding 30.0% Elvacite® 2008 Acrylic Resin (obtained from ICI Acrylics, Inc., now Lucite International, Inc.), a methyl methacrylate resin, to a 50/50 mixture of carbitol acetate and beta-terpineol organic solvents. This mixture was heated and stirred at 90° C. for 1-2 hours to dissolve all the resin. The two media were mixed in the wt % ratios shown below. Fumed silica (obtained from Cabot Corp., Boston, Mass.), a silicone printing aid and additional carbitol acetate solvent were also added in the wt %'s shown.

The composition, based on the total weight of the composition, was:

| | |
|---|---|
| 86.04 wt % | Medium A |
| 5.81 | Medium B |
| 0.93 | Fumed silica |
| 0.24 | Silicone Printing Aid |
| 6.98 | Carbitol acetate solvent |

This composition was mixed for 30 minutes on a planetary mixer. The composition was then transferred to a three-roll mill where it was subjected to one pass at 150 psi to produce the PTF encapsulant composition.

A PTC circuit was then fabricated as follows. A pattern of a series of interdigitated silver lines were printed with DuPont silver paste 5064 (E. I. DuPont, Wilmington, Del.) using a 280 mesh stainless steel screen. The patterned lines were dried at 140° C. for 15 min. in a forced air box oven. Then, a standard PTC circuit pattern was overprinted with DuPont Product 7282 PTC carbon (DuPont, Wilmington, Del.) to form a wide geometry resistor with the interdigitated 5064 silver termination. This was printed using a 280 mesh stainless steel screen. The PTC carbon was dried at 140° C. for 15 min. in a forced air box oven. Finally, the encapsulant composition was screen printed over the PTC pattern using the same screen as above and dried at 140° C. for 15 min. The resistance shift of the PTC circuit after holding the circuit at 90° C. for 24 hours was measured and the results are shown in Table 1. The power cycling shift was also measured. Power cycling was carried by applying 12 Volts for 15 minutes and power was then removed for 45 minutes. This was repeated hourly and the equilibrium temperature was measured during the power-on cycle. The results are shown in Table 1.

COMPARATIVE EXAMPLE 1

A PTC circuit was produced exactly as described in Example 1. The only difference was that the encapsulant composition was not used. Properties of this PTC circuit are summarized in Table I.

TABLE I

| | Resistance Shift 24 Hrs. @ 90° C. | Power Cycling Shift (20 Cycles) |
|---|---|---|
| Example 1 | −3.0% | 2 Degree C. Shift |
| Comparative Example 1 (no encapsulant) | −13.0% | 10 Degree C. Shift |

The improvement in performance as a result of the encapsulant is apparent from the results shown in Table I. The resistance shift observed without the encapsulant is over 4 times that with the encapsulant. With the power cycling the equilibrium temperature without the encapsulant, continues to rise with each cycle but the encapsulated heater circuit shows good temperature stability. Additionally, the magnitude of the PTC effect as measured by the ratio of the resistance at 70° C. to the resistance at room temperature was approximately 20% higher in the PTC circuit of Example 1 compared to that of the PTC circuit of Comparative Example 1, further supporting the improvement seen when using the Encapsulant.

What is claimed is:

1. A positive temperature coefficient heating circuit comprising an encapsulant formed from an encapsulant composition consisting essentially of:
   (a) 70-97 wt % of a first organic medium, based on the total weight of the encapsulant composition, said first organic medium comprising 30-60 wt % thermoplastic fluoropolymer resin dissolved in a first organic solvent, wherein the weight percent of said thermoplastic fluoropolymer resin is based on the total weight of said first organic medium; and
   (b) 3-30 wt % of a second organic medium, based on the total weight of the encapsulant composition, said second organic medium comprising 10-50 wt % acrylic resin dissolved in a second organic solvent, wherein the weight percent of said acrylic resin is based on the total weight of said second organic medium;
wherein said encapsulant composition has been heated to remove all solvent.

2. The positive temperature coefficient heating circuit of claim 1, wherein said thermoplastic fluoropolymer resin is a polyvinylidene fluoride homopolymer or a polyvinylidene fluoride-based copolymer and said acrylic resin is methyl methacrylate copolymer.

3. The positive temperature coefficient heating circuit of claim 2, wherein said thermoplastic fluoropolymer resin is polyvinylidene fluoride-hexafluoropropylene-tetrafluoroethylene copolymer.

4. A positive temperature coefficient heating circuit comprising an encapsulant formed from an encapsulant composition consisting essentially of:
   (a) 70-97 wt % of a first organic medium, based on the total weight of the encapsulant composition, said first organic medium comprising 30-60 wt % thermoplastic fluoropolymer resin dissolved in a first organic solvent, wherein the weight percent of said thermoplastic fluoropolymer resin is based on the total weight of said first organic medium;
   (b) 3-30 wt % of a second organic medium, based on the total weight of the encapsulant composition, said second organic medium comprising 10-50 wt % acrylic resin dissolved in a second organic solvent, wherein the weight percent of said acrylic resin is based on the total weight of said second organic medium; and
   (c) fumed silica;
wherein said encapsulant composition has been heated to remove all solvent.

5. A heater with a positive temperature coefficient heating circuit comprising an encapsulant formed from the encapsulant composition consisting essentially of:
   (a) 70-97 wt % of a first organic medium, based on the total weight of the encapsulant composition, said first organic medium comprising 30-60 wt % thermoplastic fluoropolymer resin dissolved in a first organic solvent, wherein the weight percent of said thermoplastic fluoropolymer resin is based on the total weight of said first organic medium; and
   (b) 3-30 wt % of a second organic medium, based on the total weight of the encapsulant composition, said second organic medium comprising 10-50 wt % acrylic resin dissolved in a second organic solvent, wherein the weight percent of said acrylic resin is based on the total weight of said second organic medium;
wherein said encapsulant composition has been heated to remove all solvent.

6. The heater of claim 5 in the form of a mirror heater or a seat heater.

7. The heater of claim 6, said positive temperature coefficient heating circuit comprising a positive temperature coefficient composition comprising:
   (i) 15-30 wt % carbon black possessing a DBP absorption of about 125 cc/100 g carbon black or less;
   (ii) 10-40 wt % chlorinated, maleic anhydride grafted polypropylene resin; and
   (iii) organic medium capable of solubilizing the resin,
wherein said positive temperature coefficient composition has been heated to remove said organic medium and thereby form a positive temperature coefficient carbon resistor and wherein said encapsulant encapsulates said positive temperature coefficient carbon resistor.

* * * * *

UNITED STATES PATENT AND TRADEMARK OFFICE
CERTIFICATE OF CORRECTION

PATENT NO. : 8,575,260 B2  
APPLICATION NO. : 13/308622  
DATED : November 5, 2013  
INVENTOR(S) : Vincenzo Arancio and Jay Robert Dorfman Page 1 of 1

It is certified that error appears in the above-identified patent and that said Letters Patent is hereby corrected as shown below:

In the Specifications:

In Column 1, Line 29, please insert a -- . -- at the end of the sentence, after the word "stability".

In Column 3, Line 23, please change the word "uses" to read -- use --.

In the Claims:

In Column 5, Claim 3, Line 28, please change "coplolymer" to read -- copolymer --.

Signed and Sealed this
Fifteenth Day of April, 2014

Michelle K. Lee
*Deputy Director of the United States Patent and Trademark Office*